United States Patent
Li et al.

(10) Patent No.: US 10,053,307 B2
(45) Date of Patent: Aug. 21, 2018

(54) SHUTTLE VAN SYSTEM FOR CONTAINER TERMINAL AND METHOD FOR TRANSPORTING CONTAINERS USING SAME

(71) Applicant: Tianjin Port (Group) Co., Ltd., Tianjin (CN)

(72) Inventors: Wei Li, Tianjin (CN); Xun Li, Tianjin (CN); Guoli An, Tianjin (CN); Lianyi Zhu, Tianjin (CN); Qingxin Lv, Tianjin (CN); Rong Yang, Tianjin (CN); Qiang Li, Tianjin (CN)

(73) Assignee: TIANJIN PORT (GROUP) CO., LTD., Tianjin (CN)

( * ) Notice: Subject to any disclaimer, the term of this patent is extended or adjusted under 35 U.S.C. 154(b) by 741 days.

(21) Appl. No.: 14/571,273

(22) Filed: Dec. 15, 2014

(65) Prior Publication Data
US 2015/0098776 A1  Apr. 9, 2015

Related U.S. Application Data

(63) Continuation-in-part of application No. PCT/CN2014/072535, filed on Feb. 26, 2014.

(30) Foreign Application Priority Data

Apr. 18, 2013  (CN) .......................... 2013 1 0135264

(51) Int. Cl.
*B65G 63/02* (2006.01)
*B65G 63/06* (2006.01)
(Continued)

(52) U.S. Cl.
CPC ............. *B65G 63/025* (2013.01); *B60P 1/02* (2013.01); *B60P 1/4442* (2013.01);
(Continued)

(58) Field of Classification Search
CPC ................ B65G 63/025; B65G 63/065; B65G 2814/0313; B60P 1/02; B60P 1/4442; B60P 1/4485
See application file for complete search history.

(56) References Cited

U.S. PATENT DOCUMENTS

| 4,479,750 A * | 10/1984 | Johnson, Jr. ........... B65G 67/02 254/45 |
| 2005/0158158 A1 * | 7/2005 | Porta ................... B65G 63/025 414/392 |

(Continued)

*Primary Examiner* — Saul Rodriguez
*Assistant Examiner* — Ashley K Romano
(74) *Attorney, Agent, or Firm* — Matthias Scholl, PC; Matthias Scholl (57) ABSTRACT

A shuttle van system for a container terminal, including: at least one rail and a transfer device. The transfer device includes a plurality of shuttle vans and a plurality of transition platforms. Each shuttle van includes: a base frame, a wheel group, a wheel driving device, a lifting device, and a supporting plate. Each transition platform includes brackets. The shuttle vans run on the rail between the brackets. The lifting device of the shuttle van is configured to lift the container from the supporting plate. The container is transferred from the supporting plate of the shuttle van to the bracket after contraction of the lifting device.

3 Claims, 5 Drawing Sheets

(51) Int. Cl.

| | |
|---|---|
| *B65G 67/04* | (2006.01) |
| *B65G 67/24* | (2006.01) |
| *B60P 1/02* | (2006.01) |
| *B60P 1/44* | (2006.01) |
| *B61D 3/20* | (2006.01) |
| *B61D 47/00* | (2006.01) |

(52) U.S. Cl.
CPC .............. *B60P 1/4485* (2013.01); *B61D 3/20* (2013.01); *B61D 47/00* (2013.01); *B65G 63/065* (2013.01); *B65G 67/04* (2013.01); *B65G 67/24* (2013.01); *B65G 2811/09* (2013.01); *B65G 2814/0313* (2013.01)

(56) References Cited

U.S. PATENT DOCUMENTS

2005/0226706 A1* 10/2005 Thomas .................... B60P 1/38
          414/467
2007/0217894 A1*  9/2007 Tian ....................... B65G 63/025
          414/139.9
2013/0011230 A1*  1/2013 Barry ...................... B61D 47/00
          414/399

\* cited by examiner

SHUTTLE VAN SYSTEM FOR CONTAINER TERMINAL AND METHOD FOR TRANSPORTING CONTAINERS USING SAME

CROSS-REFERENCE TO RELATED APPLICATIONS

This application is a continuation-in-part of International Patent Application No. PCT/CN2014/072535 with an international filing date of Feb. 26, 2014, designating the United States, now pending, and further claims priority benefits to Chinese Patent Application No. 201310135264.3 filed Apr. 18, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to the field of loading and unloading of containers in a container terminal, and more particularly to a shuttle van system for a container terminal and a method for transporting containers using the same.

Description of the Related Art

Existing automatic container terminals utilize straddle carriers and the like to transport containers locally. However, straddle carriers are not very efficient and may require subsequent reversing operations during dispatching.

SUMMARY OF THE INVENTION

In view of the above-described problems, it is one objective of the invention to provide a shuttle van system for a container terminal and a method for transporting containers. The system and the method have high transportation efficiency, low energy consumption and meet the requirement for long distance transportation.

To achieve the above objective, in accordance with one embodiment of the invention, there is provided a first shuttle van system for a container terminal. The first shuttle van system comprises: at least one rail; and a transfer device, the transfer device comprising a plurality of shuttle vans and a plurality of transition platforms. Each shuttle van comprises: a base frame, a wheel group, a wheel driving device, a lifting device, and a supporting plate. Each transition platform comprises brackets. The rail is disposed in a direction vertical to a quay frontage and passes through a storage yard. The transfer device is disposed on the rail and is configured to relay a container. The rail is disposed beneath a yard crane. A working radius of the yard crane is extended to the rail and a container stacking zone of the storage yard. The shuttle vans run on the rail and the transition platforms are disposed along the rail. The wheel group is disposed on the base frame and matches with the rail of the shuttle van system. The wheel driving device is disposed on the base frame for driving the wheel group. The lifting device is disposed at an upper end of the base frame. The supporting plate is disposed on the lifting device for receiving the container. The brackets are symmetrically arranged on two sides of the rail for receiving the container. The shuttle vans run on the rail between the brackets. The lifting device of the shuttle van is configured to lift the container from the supporting plate. The container is transferred from the supporting plate of the shuttle van to the brackets after contraction of the lifting device.

In a class of this embodiment, the wheel driving device is a hydraulic actuator or a pneumatic actuator.

In a class of this embodiment, the lifting device of the shuttle van is a hydraulic cylinder or a hydraulic scissor tower or an electric device.

In accordance with another embodiment of the invention, there is provided a first method for transporting containers according to the first shuttle van system. The first method comprises a first process for transferring the container from a first transition platform and a second process for transferring the container to a second transition platform.

The first process for transferring the container from the first transition platform comprises:

1) disposing the container on the first transition platform;
2) operating the lifting device of a shuttle van to a non-lifting state, allowing the shuttle van to run along the rail to between the brackets of the first transition platform;
3) starting the lifting device of the shuttle van to a lifting state, supporting the container by the supporting plate, enabling a height of the supporting plate to be higher than that of the first transition platform whereby realizing separation of the container from the first transition platform; and
4) allowing the shuttle van to leave the first transition platform along the rail whereby finishing the transfer of the container from the first transition platform; and The second process for transferring the container to the second transition platform comprises:

1) disposing the container on the supporting plate of the shuttle van;
2) operating the lifting device of the shuttle van to the lifting state, and allowing the shuttle van to run along the rail to between brackets of the second transition platform;
3) starting the lifting device of the shuttle van to the non-lifting state, descending the supporting plate and the container, disposing the container on the second transition platform, and enabling the height of the supporting plate to be lower than that of the second transition platform; and
4) allowing the shuttle van to leave the second transition platform along the rail to return to the first transition platform, whereby finishing the transferring of the container to the second transition platform.

A next shuttle van repeats the above processes whereby transferring the container to a third transition platform. The process of transferring the container to the transition platform and the process of transferring the container to the next transition platform are continuously repeated until the container is transported to the transition platform disposed at an end point of the rail of the system. Different shuttle vans run between two adjacent transition platforms to achieve the relay of the container.

In accordance with still another embodiment of the invention, there is provided a second shuttle van system for a container terminal. The second shuttle van system comprises: at least one rail; and a transfer device, the transfer device comprising: a plurality of shuttle vans and a plurality of transition platforms. Each shuttle van comprises: a base frame, a wheel group, a wheel driving device, and a bracket. Each transition platform comprises platform lifting devices and pallets. The rail is disposed in a direction vertical to a quay frontage and passes through a storage yard. The transfer device is disposed on the rail and is configured to relay the container. The rail is disposed beneath a yard crane. A working radius of the yard crane is extended to the rail and a container stacking zone of the storage yard. The shuttle vans run on the rail and the transition platforms are disposed along the rail. The wheel group is disposed on the base frame and matches with the rail of the shuttle van system. The wheel driving device is disposed on the base frame for driving the wheel group. The bracket is disposed on an upper end of the base frame for receiving the container. The platform lifting devices are symmetrically disposed at two sides of the rail. The pallets are disposed on the platform lifting devices for receiving the container. The shuttle vans run on the rail between the platform lifting devices. When the shuttle vans run inside the transition platform, the platform lifting devices lift the pallets to lift the container from the shuttle van and transfer the container to the transition platform.

In a class of this embodiment, the wheel driving device is a hydraulic actuator or a pneumatic actuator.

In a class of this embodiment, the platform lifting device is a hydraulic cylinder or an electric device.

In accordance with still another embodiment of the invention, there is provided a second method for transporting containers according to the second shuttle van system. The second method comprises a first process for transferring the container from a first transition platform and a second process for transferring the container to a second transition platform.

The first process for transferring the container from the first transition platform comprises:
1) disposing the container on the first transition platform, operating the platform lifting device to a lifting state;
2) allowing the shuttle van to run along the rail inside the first transition platform;
3) starting the platform lifting device to a non-lifting state, descending pallets of the first transition platform to beneath the bracket of the shuttle van, disposing the container in the bracket of the shuttle van whereby realizing separation of the container from the first transition platform; and
4) allowing the shuttle van carrying the container to leave the first transition platform along the rail whereby finishing the transfer of the container from the first transition platform;

The second process for transferring the container to the second transition platform comprises:
1) disposing the container on the bracket of the shuttle van, and allowing the shuttle van to run along the rail inside the second transition platform;
2) operating the platform lifting device of the second transition platform to the non-lifting state,
3) starting the platform lifting device of the transition platform to the lifting state, lifting the container by the pallets, disposing the container on the second transition platform, and enabling a height of the pallets to be higher than that of the bracket of the shuttle van; and
4) allowing the shuttle van to leave the second transition platform along the rail to return to the first transition platform, whereby finishing the transferring of the container to the second transition platform.

A next shuttle van repeats the above processes whereby transferring the container to a third transition platform. The process of transferring the container to the transition platform and the process of transferring the container to the next transition platform are continuously repeated until the container is transported to the transition platform disposed at an end point of the rail of the system. Different shuttle vans run between two adjacent transition platforms to achieve the relay of the container.

Advantages according to embodiments of the invention are summarized as follows:

The shuttle van technology is utilized, so that the relay and automatic loading and unloading of the containers are realized, the energy is saved, and the efficiency is relatively high.

The shuttle van is substituted for the yard crane for conducting the long distance transportation, thereby reducing the operation cost.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a shuttle van system for a container terminal and a method for transferring a container are described below. It should be noted that the following examples are intended to describe and not to limit the invention.

Example 1

As shown in FIGS. 1, 2A, 2B, 3A, and 3B, a shuttle van system for a container terminal comprises: four rail groups 11 disposed in a direction vertical to a quay frontage and passes through a storage yard and transfer devices 12 disposed on the rail groups for transferring containers. Two rail groups 11 are disposed at a left side of the storage yard back to the quay frontage, and another two rail groups 11 are disposed at a right side of the storage yard back to the quay frontage. The four rail groups 11 are disposed beneath yard cranes 40. A working radius of each yard crane 40 is extended to the rail group and a container stacking zone of the storage yard.

The transfer device 12 comprises a plurality of shuttle vans 121 running on the rail groups and a plurality of transition platforms 122 arranged along the rail groups. Each rail group is provided with three transition platforms 122 and two shuttle vans 121.

Each shuttle van 121 comprises: a base frame 1211, a wheel group 1212 disposed on the base frame 1211 and matching with the rail 11 of the shuttle van system, a wheel driving device disposed on the base frame 1211 for driving the wheel group 1212, a lifting device 1213 disposed at an upper end of the base frame, and a supporting plate 1214 disposed on the lifting device 1213 for receiving the container. The wheel driving device is a hydraulic actuator or a pneumatic actuator. The lifting device 1213 of the shuttle van is a hydraulic cylinder or a hydraulic scissor tower or an electric device.

Each transition platform 122 comprises brackets 1221 symmetrically arranged on two sides of the rail for receiving the container. The shuttle vans run on the rail between the brackets 1221. The lifting device 1213 of the shuttle van is configured to lift the container from the supporting plate 1214. The container is transferred from the supporting plate 1214 of the shuttle van 121 to the bracket 1221 after contraction of the lifting device 1213.

A method for transporting containers of the shuttle van system for the container terminal comprises a first process for transferring the container from a first transition platform and a second process for transferring the container to a second transition platform.

The first process for transferring the container from the first transition platform comprises:
1) disposing the container on the first transition platform 122;
2) operating the lifting device 1213 of a shuttle van 121 to a non-lifting state, allowing the shuttle van 121 to run along the rail 11 to between the brackets 1221 of the first transition platform 122;
3) starting the lifting device 1213 of the shuttle van to a lifting state, supporting the container by the supporting plate 1214, enabling a height of the supporting plate 1214 to be higher than that of the first transition platform 122 whereby realizing separation of the container from the first transition platform 122; and
4) allowing the shuttle van 121 to leave the first transition platform 122 along the rail 11 whereby finishing the transfer of the container from the first transition platform; and The second process for transferring the container to the second transition platform comprises:
1) disposing the container on the supporting plate 1214 of the shuttle van 121;
2) operating the lifting device 1213 of the shuttle van to the lifting state, and allowing the shuttle van 121 to run along the rail 11 to between brackets of the second transition platform 122;
3) starting the lifting device 1213 of the shuttle van to the non-lifting state, descending the supporting plate 1214 and the container, disposing the container on the second transition platform 122, and enabling the height of the supporting plate 1214 to be lower than that of the second transition platform 122; and
4) allowing the shuttle van 121 to leave the second transition platform 122 along the rail 11 to return to the first transition platform 122, whereby finishing the transferring of the container to the second transition platform.

Figure 1:
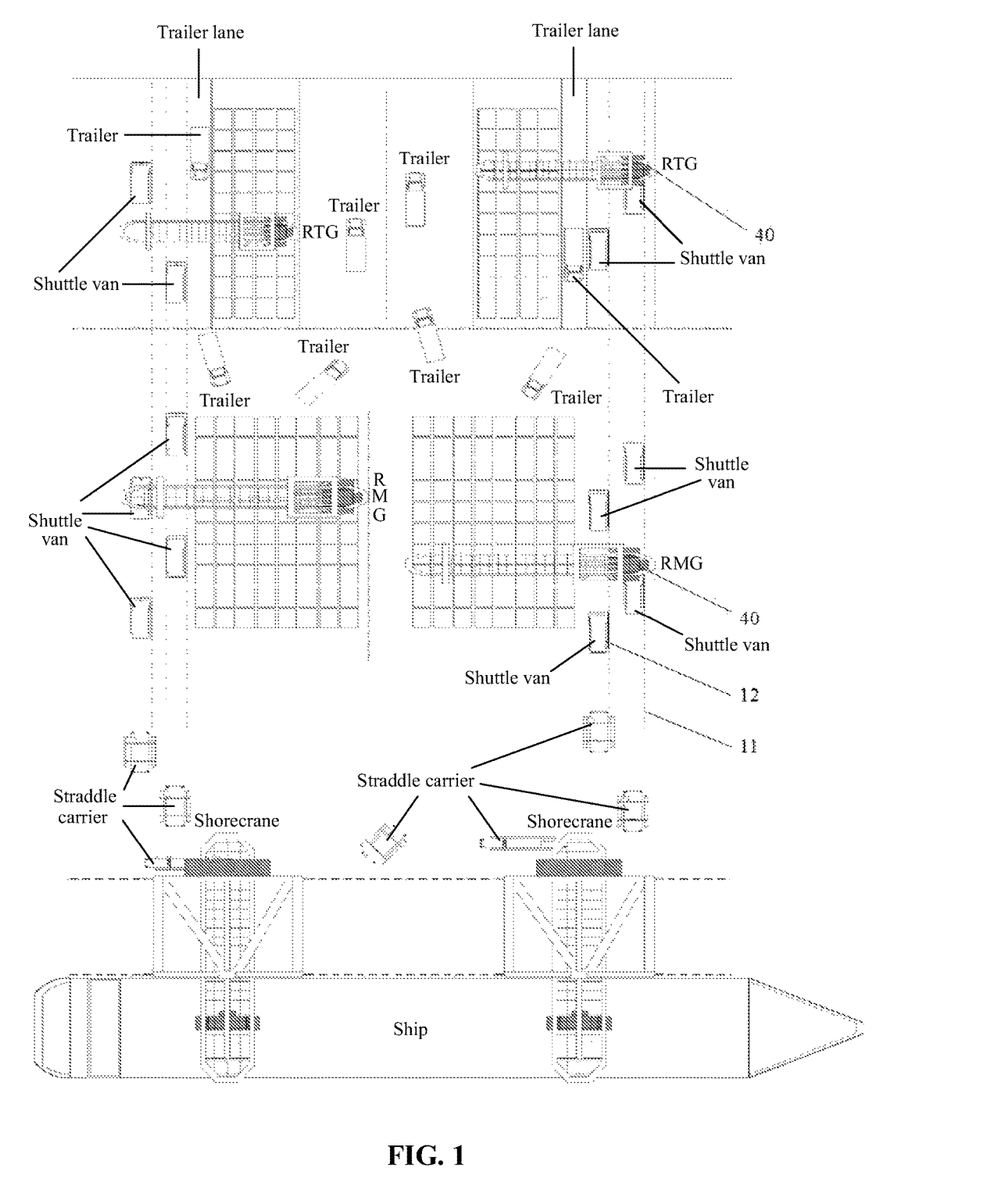
FIG. 1 is a structure diagram of a shuttle van system for a container terminal in accordance with one embodiment of the invention.
Figure 2A:
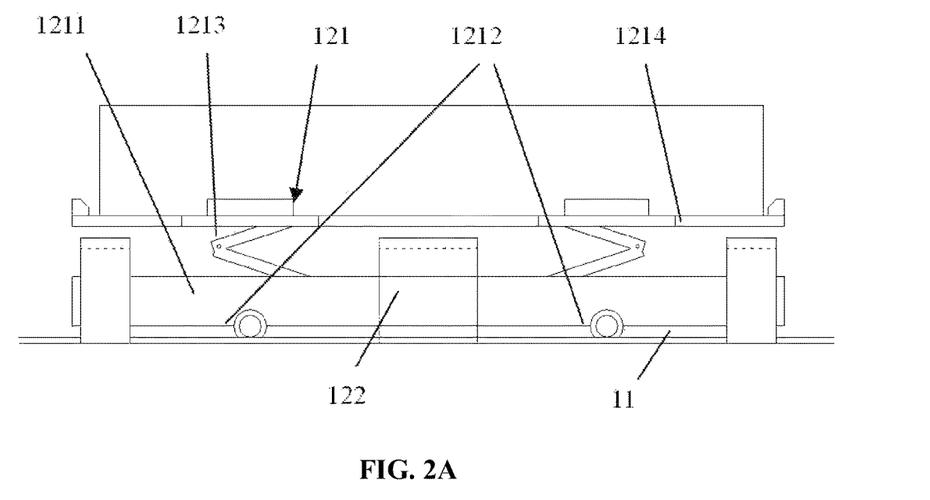
FIG. 2A is a front view of a transfer device lifting a container in accordance with one embodiment of the invention.
Figure 2B:
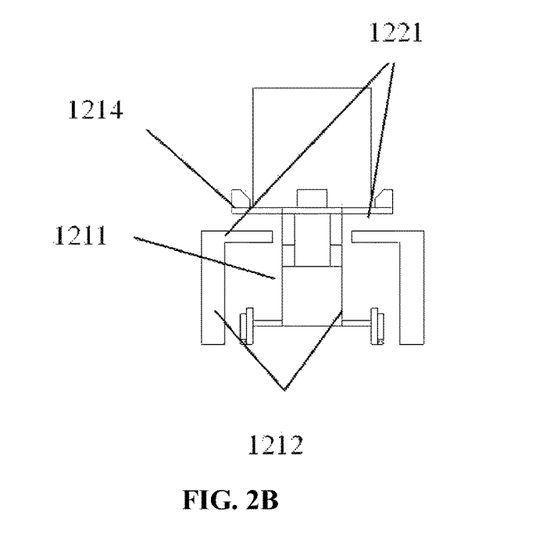
FIG. 2B is a left view of FIG. 2A.
Figure 3A:
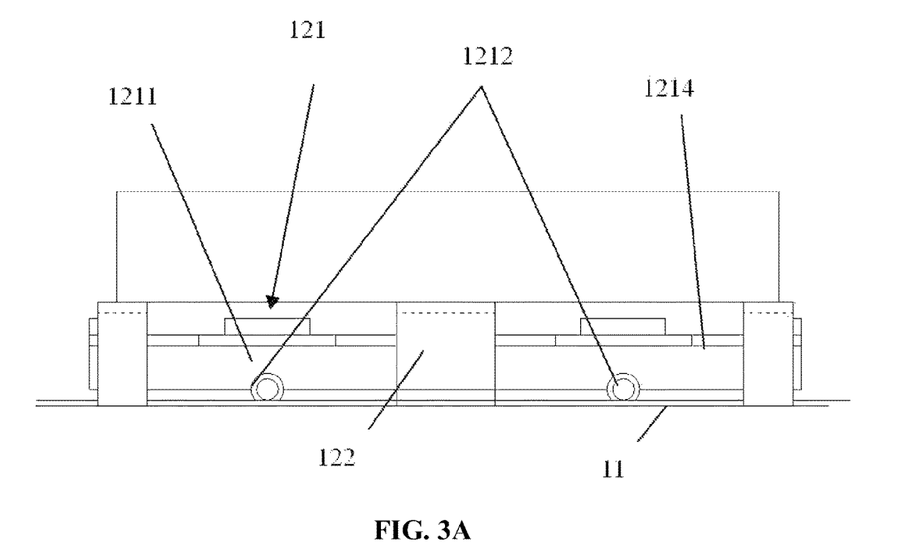
FIG. 3A is a front view of a transfer device descending a container in accordance with one embodiment of the invention.
Figure 3B:
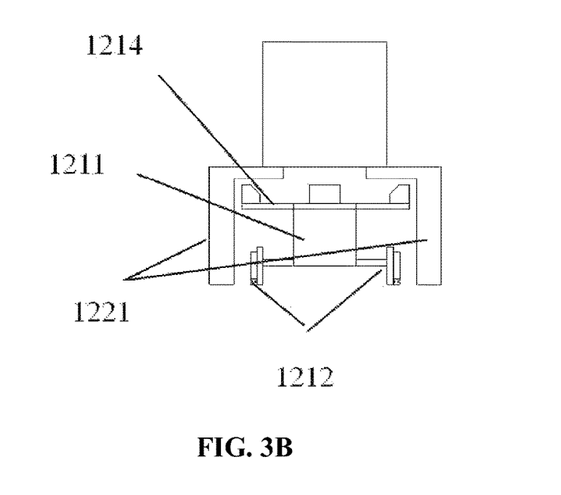
FIG. 3B is a left view of FIG. 3A.

A next shuttle van repeats the above processes to transfer the container to a third transition platform 122. The process of transferring the container to the transition platform 122 and the process of transferring the container to the next transition platform 122 are continuously repeated until the container is transported to the transition platform 122 disposed at an end point of the rail of the system. Different shuttle vans 121 run between two adjacent transition platforms 122 to achieve the relay of the container.

The arrangements of the shuttle vans and the transition platforms effectively achieve the relay of the container. A single shuttle van runs between two adjacent transition platforms, so that the transporting distance of the signal shuttle van is shortened. The containers are continuously transferred among the shuttle vans and the transition platforms, thereby decreasing the transportation time and improving the transportation efficiency.

Example 2

As shown in FIGS. 1, 4A, 4B, 5A, and 5B, a shuttle van system for a container terminal comprises: four rail groups 11 disposed in a direction vertical to a quay frontage and passes through a storage yard and transfer devices 12 disposed on the rail groups for transferring containers. Two rail groups 11 are disposed at a left side of the storage yard back to the quay frontage, and another two rail groups 11 are disposed at a right side of the storage yard back to the quay frontage. The four rail groups 11 are disposed beneath yard cranes 40. A working radius of each yard crane 40 is extended to the rail group and a container stacking zone of the storage yard.

The transfer device 12 comprises a plurality of shuttle vans 123 running on the rail groups and a plurality of transition platforms 124 arranged along the rail groups. Each rail group is provided with three transition platforms 124 and two shuttle vans 123.

Each shuttle van 123 comprises: a base frame 1231, a wheel group 1232 disposed on the base frame and matching with the rail of the shuttle van system, a wheel driving device disposed on the base frame 1231 for driving the wheel group 1232, and a bracket 1233 disposed on an upper end of the base frame for receiving the container. The wheel driving device is a hydraulic actuator or a pneumatic actuator.

Each transition platform 124 comprises platform lifting devices 1241 symmetrically disposed at two sides of the rail and pallets 1242 disposed on the platform lifting devices for receiving the container. The platform lifting device 1241 is a hydraulic cylinder or an electric device. The shuttle vans 123 run on the rail 11 between the platform lifting devices 1241. When the shuttle vans 123 run inside the transition platform 124, the platform lifting devices 1241 lift the pallets 1242 to lift the container from the shuttle van 123 and transfer the container to the transition platform 124.

A method for transporting containers of the shuttle van system for the container terminal comprises a first process for transferring the container from a first transition platform and a second process for transferring the container to a second transition platform.

The first process for transferring the container from the first transition platform comprises:
1) disposing the container on the first transition platform 124, operating the platform lifting device 1241 to a lifting state;
2) allowing the shuttle van 121 to run along the rail 11 inside the first transition platform 124;
3) starting the platform lifting device 1241 to a non-lifting state, descending pallets of the first transition platform 124 to beneath the bracket 1233 of the shuttle van 123, disposing the container in the bracket 1233 of the shuttle van 123 whereby realizing separation of the container from the first transition platform 124; and 4) allowing the shuttle van 121 carrying the container to leave the first transition platform 124 along the rail 11 whereby finishing the transfer of the container from the first transition platform; and The second process for transferring the container to the second transition platform comprises:
1) disposing the container on the bracket 1233 of the shuttle van 121, and allowing the shuttle van 121 to run along the rail 11 inside the second transition platform 124;
2) operating the platform lifting device 1241 of the second transition platform 124 to the non-lifting state,
3) starting the platform lifting device 1241 of the second transition platform 124 to the lifting state, lifting the container by the pallets 1242, disposing the container on the second transition platform 124, and enabling a height of the pallets 1241 to be higher than that of the bracket 1233 of the shuttle van 123; and
4) allowing the shuttle van 121 to leave the second transition platform 124 along the rail 11 to return to the first transition platform 124, whereby finishing the transferring of the container to the second transition platform.

Figure 4A:
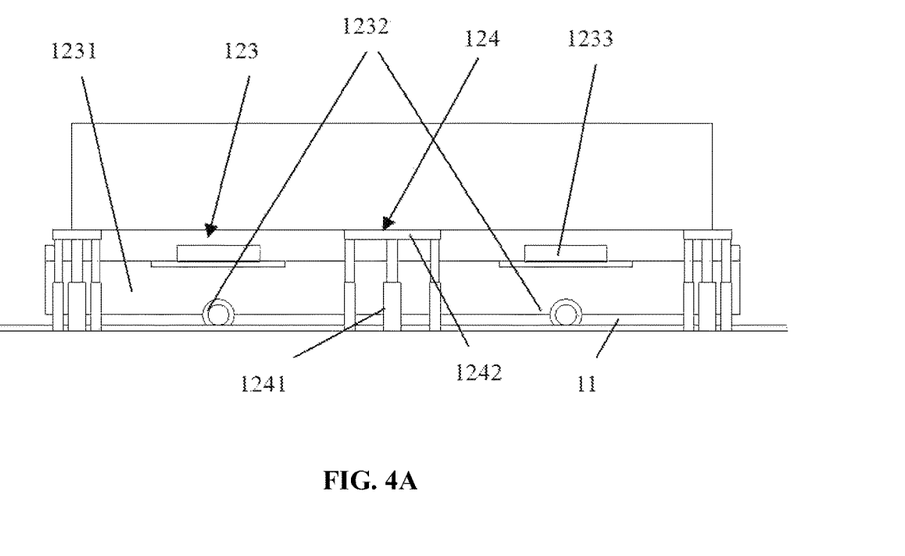
FIG. 4A is a front view of a transfer device lifting a container in accordance with one embodiment of the invention.
Figure 4B:
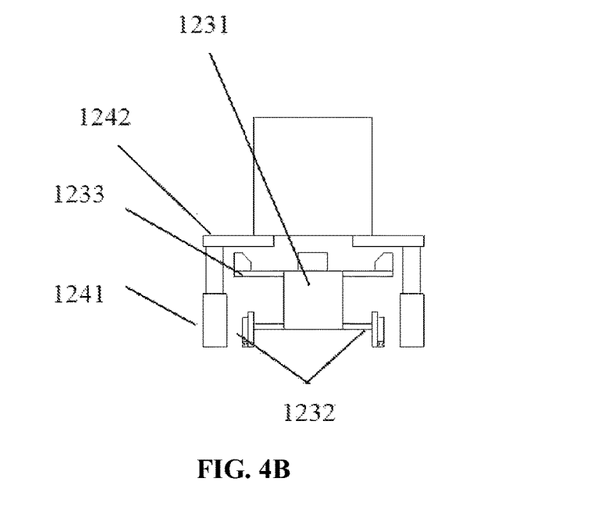
FIG. 4B is a left view of FIG. 4A.
Figure 5A:
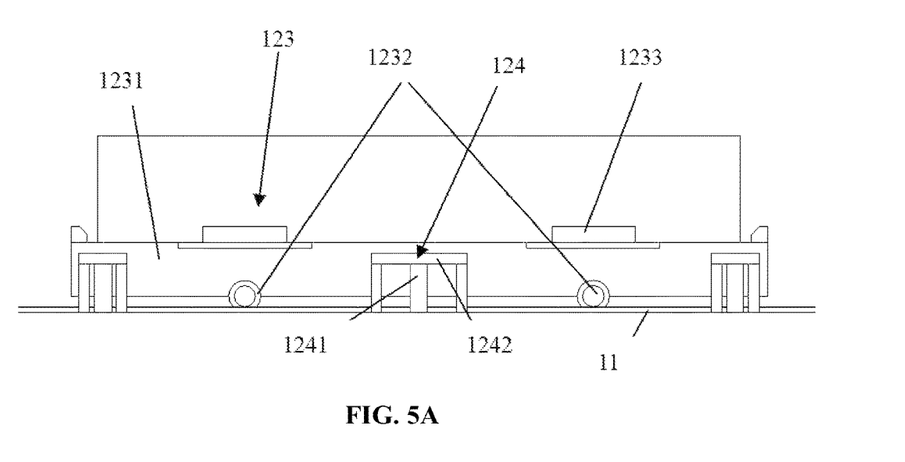
FIG. 5A is a front view of a transfer device descending a container in accordance with one embodiment of the invention.
Figure 5B:
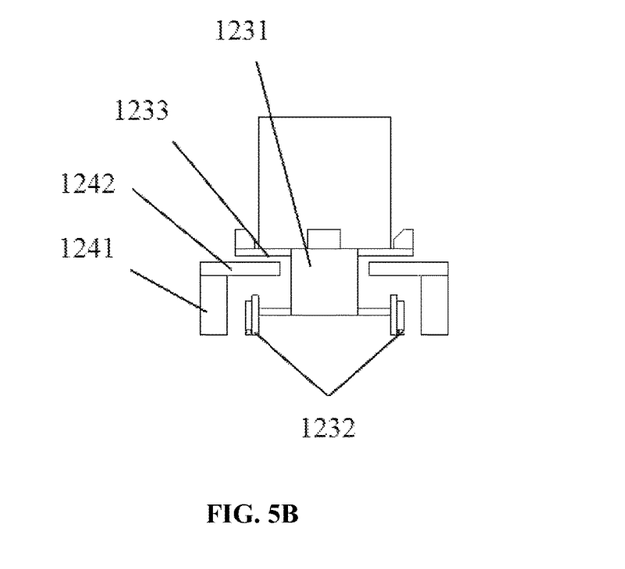
FIG. 5B is a left view of FIG. 5A.

A next shuttle van repeats the above processes whereby transferring the container to a third transition platform 124. The process of transferring the container to the transition platform 124 and the process of transferring the container to the next transition platform 124 are continuously repeated until the container is transported to the transition platform 124 disposed at an end point of the rail of the system. Different shuttle vans 121 run between two adjacent transition platforms 124 to achieve the relay of the container.

The arrangements of the shuttle vans and the transition platforms effectively achieve the relay of the container. A single shuttle van runs between two adjacent transition platforms, so that the transporting distance of the signal shuttle van is shortened. The containers are continuously transferred among the shuttle vans and the transition platforms, thereby decreasing the transportation time and improving the transportation efficiency.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A shuttle van system for transporting containers between two loading locations, the system comprising:
   a) at least one rail; and
   b) a transfer device, the transfer device comprising: a plurality of shuttle vans and a plurality of transition platforms; each of the plurality of shuttle vans comprising: a base frame, a wheel group, a wheel driving device, and a bracket; each of the plurality of transition platforms comprising platform lifting devices and pallets;

wherein
   the rail extends between the two loading locations;
   the plurality of transition platforms is disposed along the rail and is distributed between the two loading locations;
   the wheel group is disposed on the base frame and matches with the rail of the shuttle van system; the wheel driving device is disposed on the base frame for driving the wheel group; the bracket is disposed on an upper end of the base frame for receiving a container;
   the platform lifting devices are symmetrically disposed at two sides of the rail;
   the pallets are disposed on the platform lifting devices for storing a container;
   the plurality of shuttle vans is disposed on the rail;
   each of the plurality of shuttle vans is disposed between two adjacent transition platforms; and
   when a shuttle van runs inside a transition platform, the platform lifting devices lift or descend the pallets to lift or descend a container and transfer the container between the shuttle van and the transition platform.

2. The system of claim 1, wherein the wheel driving device is a hydraulic actuator or a pneumatic actuator.

3. The system of claim 1, wherein the platform lifting device is a hydraulic cylinder or an electric device.

* * * * *